(12) United States Patent
Tsubokura et al.

(10) Patent No.: US 7,573,542 B2
(45) Date of Patent: Aug. 11, 2009

(54) LIQUID CRYSTAL DISPLAY DEVICE

(75) Inventors: Masaki Tsubokura, Mobara (JP); Toshiji Yoshino, Mobara (JP)

(73) Assignee: IPS Alpha Technology, Ltd., Chiba (JP)

( * ) Notice: Subject to any disclaimer, the term of this patent is extended or adjusted under 35 U.S.C. 154(b) by 31 days.

(21) Appl. No.: 11/970,608

(22) Filed: Jan. 8, 2008

(65) Prior Publication Data
US 2008/0211988 A1    Sep. 4, 2008

(30) Foreign Application Priority Data
Jan. 9, 2007    (JP) .............................. 2007-000908

(51) Int. Cl.
*G02F 1/1335* (2006.01)
*H01R 33/02* (2006.01)

(52) U.S. Cl. .............................. 349/60; 349/58; 349/61; 362/225; 362/362; 362/647; 362/658; 439/226

(58) Field of Classification Search .................... 349/56, 349/58, 60, 61; 362/225, 227, 240, 362, 362/647, 658; 439/226, 235, 834
See application file for complete search history.

(56) References Cited
U.S. PATENT DOCUMENTS
2005/0141220 A1 *   6/2005   Kim et al. .................... 362/240
2005/0265047 A1    12/2005   Yun et al.

FOREIGN PATENT DOCUMENTS
JP          2005-347259        12/2005

* cited by examiner

*Primary Examiner*—Frank G Font
*Assistant Examiner*—Michael P Mooney
(74) *Attorney, Agent, or Firm*—Antonelli, Terry, Stout & Kraus, LLP.

(57) ABSTRACT

The present invention provides a liquid crystal display device which can enhance the reliability of electrical connection between electrodes and metal fittings even when the irregularities exist with respect to radii of rod-shaped light sources arranged in the inside of a backlight. A liquid crystal display device includes a liquid crystal display panel and a backlight arranged on a back surface of the liquid crystal display panel, wherein the backlight includes a plurality of rod-shaped light sources each having electrode portions at both ends thereof and a base which supports the respective rod-shaped light sources at the respective electrode portions by way of an electrode fitting, the electrode fitting is configured to fix the rod-shaped light source by clamping the electrode portion, the electrode fitting being formed of a plurality of electrode fittings arranged in parallel in the longitudinal direction of the rod-shaped light source for every electrode, and each electrode fitting has an arcuate wall surface, and the respective electrode fittings arranged in parallel in the same electrode portion have radii of arcs of the wall surfaces thereof made different from each other.

10 Claims, 4 Drawing Sheets

LIQUID CRYSTAL DISPLAY DEVICE

The present application claims priority from Japanese application JP2007-000908 filed on Jan. 9, 2007, the content of which is hereby incorporated by reference into this application.

BACKGROUND OF THE INVENTION

1. Field of the Invention

The present invention relates to a liquid crystal display device, and more particularly to a liquid crystal display device having a so-called direct-type backlight.

2. Description of the Related Art

With respect to a liquid crystal display device, along with a demand for the large-sizing of a liquid crystal display panel, as a backlight, a so-called direct-type backlight which can make a planar light source uniform has been used.

In such a backlight, a plurality of fluorescent lamps is uniformly arranged in plane which faces the liquid crystal display panel. As a fluorescent lamp, there has been known a cold cathode fluorescent lamp (CCFL) and an external-electrode fluorescent lamp (EEFL). Out of these fluorescent lamps, the external-electrode fluorescent lamp is configured such that a plurality of external-electrode fluorescent lamps is supported on a casing-shaped base having a reflection means on an inner surface thereof by way of a pair of electrode fittings.

The electrode fitting also has a function of supplying a power source to the external-electrode fluorescent lamp, and a portion of the electrode fitting on which the electrode of the external-electrode fluorescent lamp is formed is constituted of a bifurcated fitting member which can clamp peripheral side surfaces of the electrode from opposing sides.

Here, it is necessary to ensure the reliable electrical connection between the electrodes of the external-electrode fluorescent lamps and the electrode fittings. This is because that even when such electrical connection is not sufficient with respect to one external-electrode fluorescent lamp by a chance, the uniformity of the light source as the planar light source is damaged.

In view of the above, there has been known a liquid crystal display device which arranges a plurality of electrode fittings in parallel in the longitudinal direction of the external-electrode fluorescent lamps for each electrode of the external-electrode fluorescent lamp. In this case, even when the connection failure occurs with respect to one electrode fitting out of a plurality of electrode fittings, the electrical connection is ensured by other remaining electrode fittings.

A liquid crystal display device having such a constitution is, for example, disclosed in the following patent document 1.

[Patent document 1] JP-A-2005-347259 (corresponding US application US2005/0265047A1)

SUMMARY OF THE INVENTION

However, with respect to the electrode fittings described in the above-mentioned patent document 1, these electrode fittings are formed on a premise that all electrode fittings have the same shape and the same size. That is, the patent document 1 fails to take a drawback that external-electrode fluorescent lamps formed of a rod-shaped light source and having different diameters due to manufacturing irregularities of the external-electrode fluorescent lamps are supported on a casing-shaped base by these electrode fittings into consideration.

That is, since the electrode fittings are preset such that a proper pushing pressure is given to the external-electrode fluorescent lamps having a predetermined diameter, when there exist some external-electrode fluorescent lamps which are manufactured with diameters different from the predetermined diameter, there may be a case that the reliable electrical connection cannot be established between the external-electrode fluorescent lamp and the electrode fitting.

Accordingly, it is an object of the present invention to provide a liquid crystal display device which can enhance the reliability of electrical connection between electrodes and metal fittings even when the irregularities exist with respect to radii of rod-shaped light sources arranged in the inside of a backlight.

To briefly explain the summary of typical inventions among the inventions disclosed in this specification, they are as follows.

A liquid crystal display device according to the present invention includes, for example, a liquid crystal display panel and a backlight arranged on a back surface of the liquid crystal display panel, wherein the backlight includes a plurality of rod-shaped light sources each having electrode portions at both ends thereof and a base which supports the respective rod-shaped light sources at the respective electrode portions by way of an electrode fitting, the electrode fitting is configured to fix the rod-shaped light source by clamping the electrode portion, the electrode fitting being formed of a plurality of electrode fittings arranged in parallel in the longitudinal direction of the rod-shaped light source for every electrode, and each electrode fitting has an arcuate wall surface, and the respective electrode fittings arranged in parallel in the same electrode portion have radii of arcs of the wall surfaces thereof made different from each other.

Here, the present invention is not limited to the above-mentioned constitution, and various modifications can be made without departing from the technical concept of the present invention.

The liquid crystal display device having such a constitution can enhance the reliability of electrical connection between the electrodes and the metal fittings even when the irregularities exist with respect to the radii of the rod-shaped light sources which are arranged in the inside of the backlight.

DESCRIPTION OF THE PREFERRED EMBODIMENT

Hereinafter, an embodiment of a liquid crystal display device according to the present invention is explained in conjunction with drawings.

Figure 2:
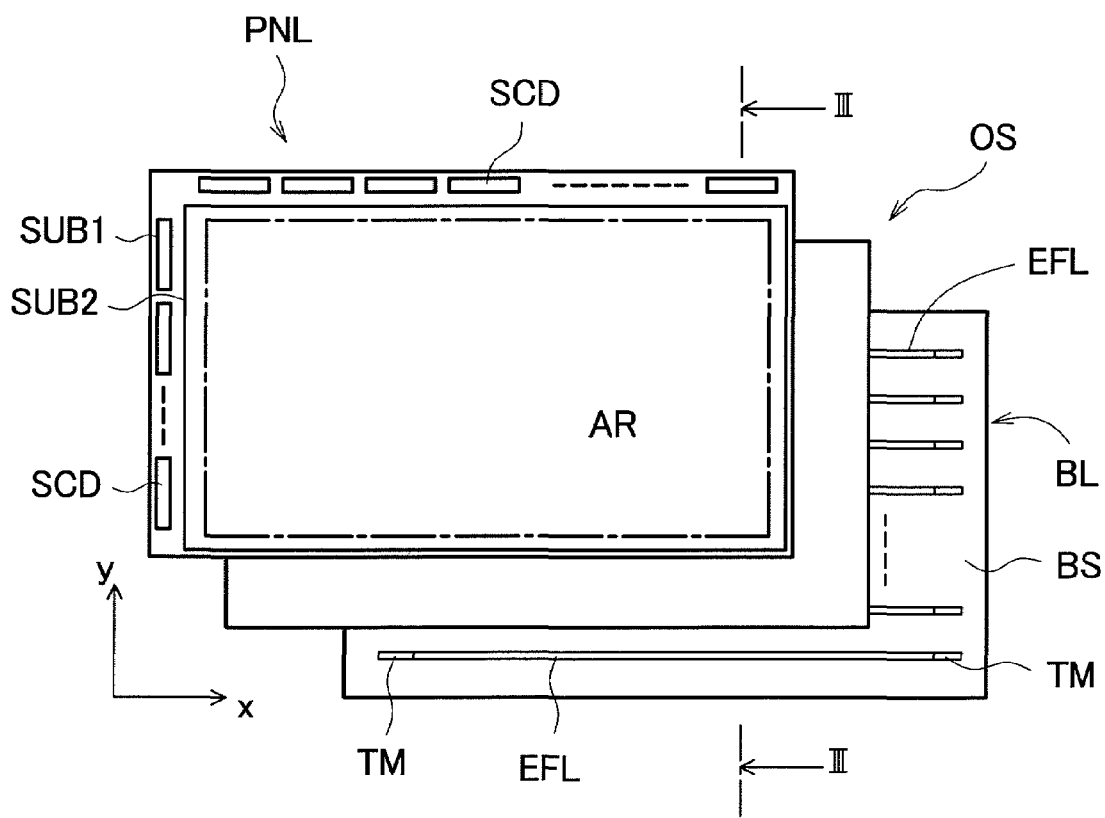
FIG. 2 is a schematic constitutional view showing one embodiment of the liquid crystal display device according to the present invention.

FIG. 2 is a schematic constitutional view showing one embodiment of the liquid crystal display device according to the present invention.

First of all, as viewed from a viewer's side, a liquid crystal display panel PNL, an optical sheet OS and a backlight BL are sequentially arranged.

The liquid crystal display panel PNL is configured such that a pair of substrates SUB1, SUB2 which is arranged in parallel and is made of glass, for example, forms an envelope, and liquid crystal is interposed between the respective substrates SUB1, SUB2 as a layer.

On a liquid-crystal-side surface of the substrate SUB1 or SUB2, pixels arranged in a matrix array are formed in a state that the liquid crystal forms one constitutional element of the pixel, and each pixel can control light transmissivity of the liquid crystal.

Further, a region on which the respective pixels are formed is referred to as a liquid crystal display region AR (a region surrounded by a chained line frame in the drawing), light from a backlight BL described later is radiated to at least a whole area of the liquid crystal display region AR, and a viewer can recognize an image through light which passes through the respective pixels.

Here, the substrate SUB1 arranged at a rear side from a viewer's side has an area larger than an area of the substrate SUB2, and a semiconductor device SCD formed of a circuit for independently driving the respective pixels is mounted on a periphery of the substrate SUB1 exposed from the substrate SUB2.

Here, the semiconductor device SCD may be mounted not only on the substrate SUB1 but also on a flexible printed circuit board connected to the substrate SUB1.

On a back surface of the liquid crystal display panel PNL, for example, a backlight BL is arranged by way of a diffusion sheet, a prism sheet or an optical sheet OS formed by stacking the diffusion sheet and the prism sheet. The optical sheet OS is provided for guiding light radiated from the backlight BL to a liquid-crystal-display-panel-PNL side by diffusing or condensing light.

The backlight BL is a so-called direct-type backlight and is constituted of a base BS having an inner wall surface substantially parallel to the liquid crystal display panel PNL, and a plurality of external-electrode fluorescent lamps EFL formed of a rod-shaped light source which is supported on the inner wall surface of the base BS and is arranged in parallel to each other in a plane parallel to the liquid crystal display panel PNL.

The external-electrode fluorescent lamps EFL, for example, have the longitudinal direction thereof aligned with the x direction in the drawing and is arranged in parallel to each other in the y direction in the drawing.

Each external-electrode fluorescent lamp EFL includes an electrode TM at both ends thereof. Portions of the respective electrodes TM are clamped by electrode fittings TMF mounted on the base BS and described later. Due to such a constitution, the external-electrode fluorescent lamps EFL are supported on the base BS and a power source is supplied to the external-electrode fluorescent lamps EFL through the electrode fittings TMF.

Here, on the inner wall surface of the base BS, a reflection means such as a reflection sheet, for example, is formed. The reflection means is provided for reflecting light from the external-electrode fluorescent lamps EFL to a liquid-crystal-display-panel-PNL side.

Further, the liquid crystal display panel PNL, the optical sheet OS and the backlight BL are accommodated in the inside of a frame FR and constitute a liquid crystal display device formed into a module.

Figure 3:
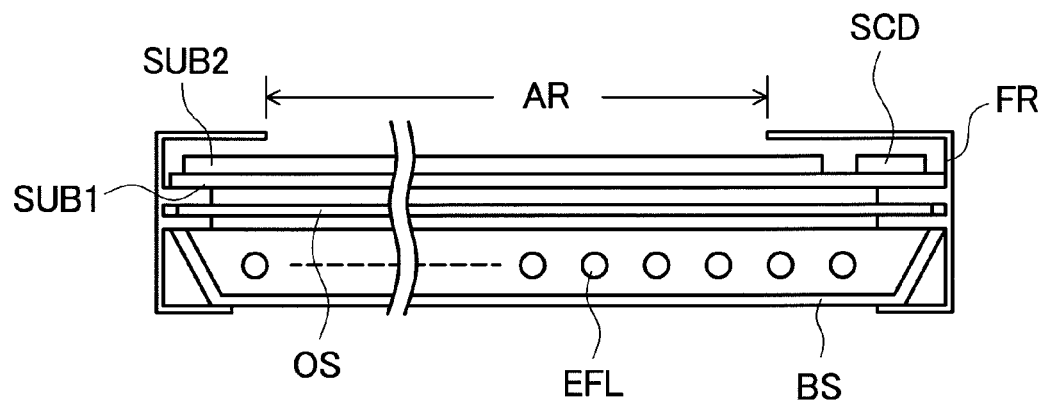
FIG. 3 is across-sectional view taken along a line III-III in FIG. 2 showing the liquid crystal display device together with a frame.

FIG. 3 is a cross-sectional view of the liquid crystal display device formed into a module and shows a cross section of a portion corresponding to a line III-III in FIG. 2. In the frame FR, on a viewer's side, an opening OP which exposes the liquid crystal display region AR of the liquid crystal display panel PNL is formed. In the frame FR, the liquid crystal display panel PNL, the optical sheet OS and the backlight BL are positioned and stored with sufficient accuracy.

Figure 4:
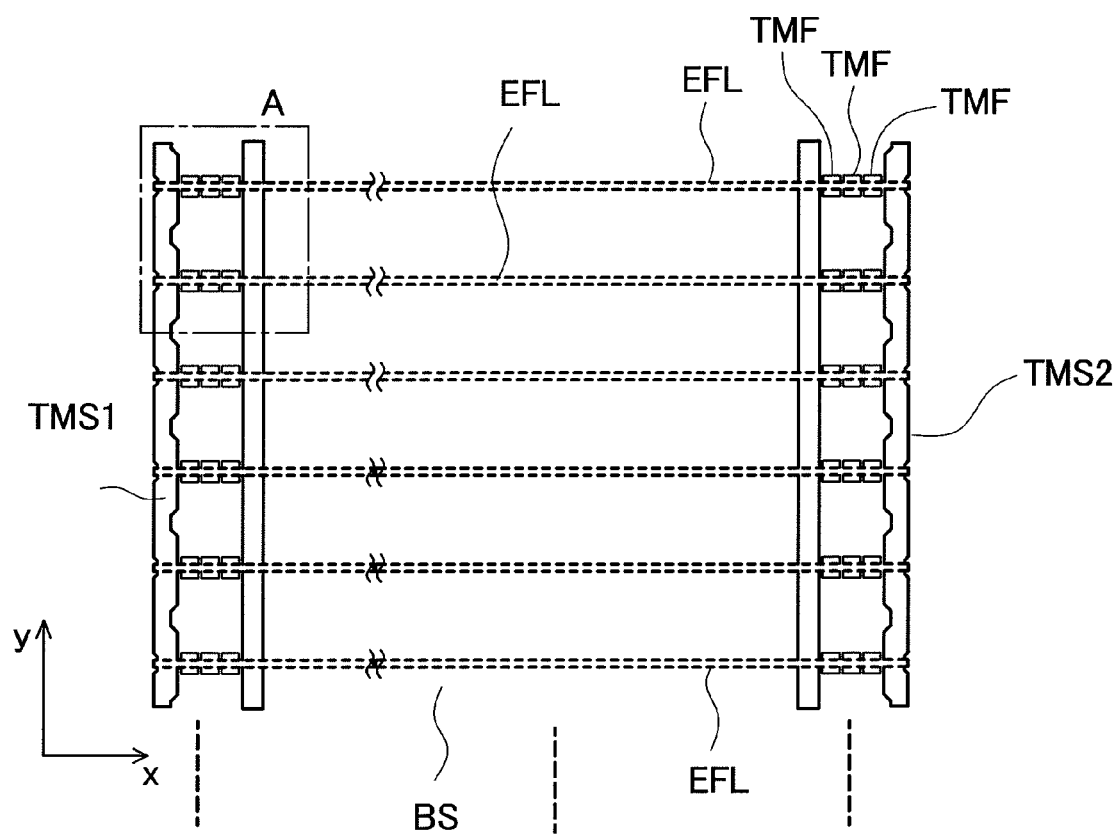
FIG. 4 is a plan view showing one embodiment of an electrode support base used in the liquid crystal display device according to the present invention.

FIG. 4 shows a pair of electrode support bases TMS1, TMS2 fixed to the base BS of the backlight BL. Here, the external-electrode fluorescent lamps EFL supported on the base BS by the electrode support bases TMS1, TMS2 are indicated by a dotted line in the drawing.

One electrode support base TMS1 is arranged on a left side (in the drawing) of a region where the external-electrode fluorescent lamps EFL are arranged, and another electrode support base TMS2 is arranged on a right side (in the drawing) of the region. These electrode support bases TMS1, TMS2 are respectively configured to extend in the y direction.

That is, the electrode support base TMS1 supports portions of the electrodes TM at left ends (in the drawing) of the respective external-electrode fluorescent lamps EFL in common, while another electrode support base TMS2 supports portions of the electrodes TM at right ends (in the drawing) of the respective external-electrode fluorescent lamps EFL in common.

Further, on the electrode support base TM1, for example, three electrode fittings TMF which are arranged along the longitudinal direction at the electrode TM of each external-electrode fluorescent lamp EFL on a left side (in the drawing) clamp the electrode TM thus supporting each external-electrode fluorescent lamp EFL. In the same manner, on the electrode support base TM2, for example, three electrode fittings TMF which are arranged along the longitudinal direction at the electrode TM of each external-electrode fluorescent lamp EFL on a right side (in the drawing) clamp the electrode TM thus supporting each external-electrode fluorescent lamp EFL.

Further, these electrode support bases TMS1, TMS2 are formed by press-forming a sheet material, for example.

Figure 5:
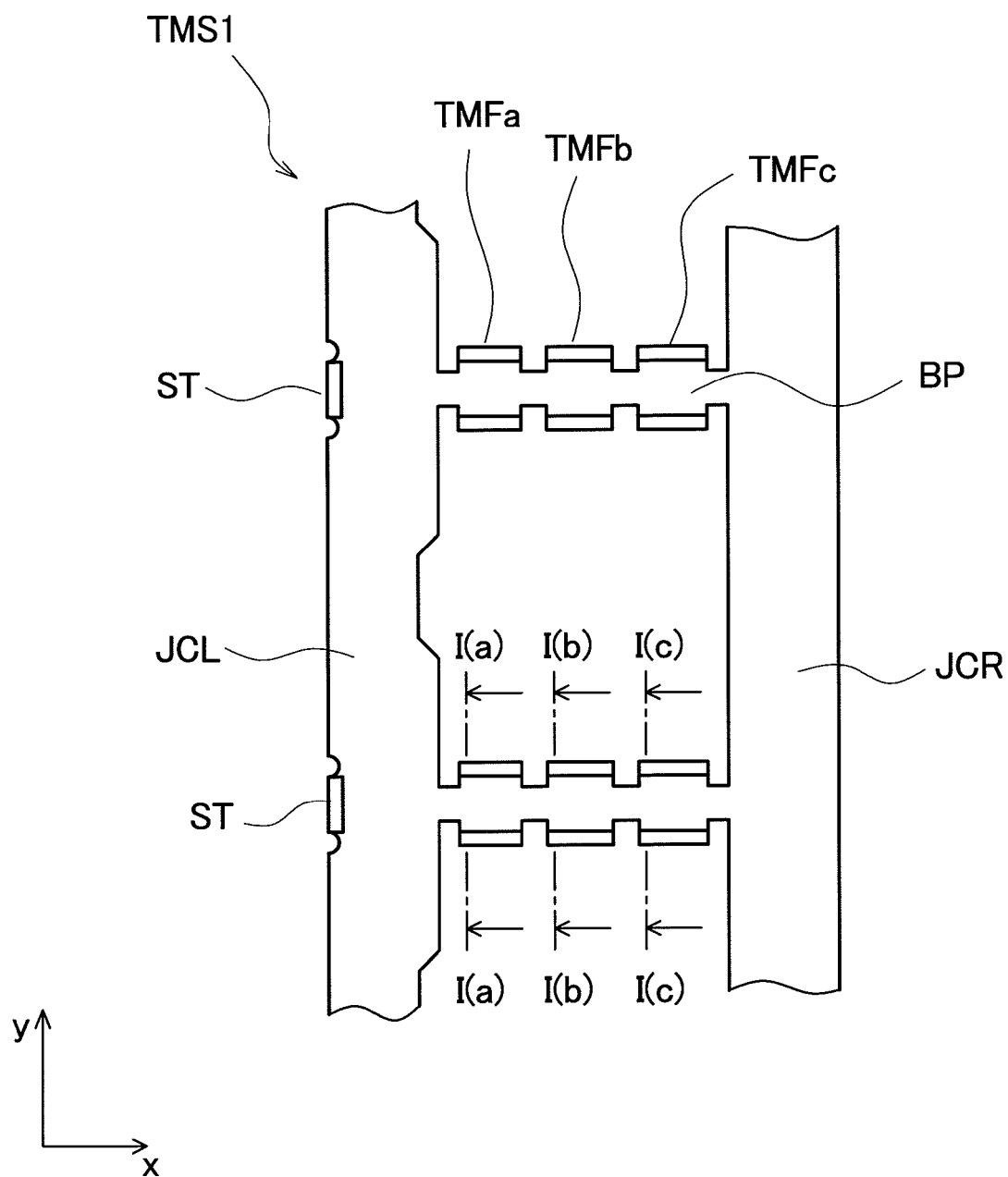
FIG. 5 is an enlarged view of the structure in a dotted frame A shown in FIG. 4.

FIG. 5 is an enlarged view drawn by extracting a portion of a dotted frame A shown in FIG. 4. In FIG. 5, the electrode support base TMS1 includes base portions BP each of which fixes three parallel electrode fittings TMF (referred to as TMFa, TMFb, TMFc from a left side in the drawing) thereto in common, and a left connecting portion JCL and a right connecting portion JCR which are connected to respective ends of the base portions BP in common. When the base portions BP and the respective connecting portions JCL, JCR are viewed in a plan view, a ladder-shaped pattern is formed.

The left connecting portion JCL includes a projecting portion ST formed on a portion thereof which intersect the extending direction (x direction in the drawing) of the base portion BP in a projecting manner. The projecting portion ST is provided for restricting the axial movement of the external-electrode fluorescent lamp EFL whose electrode TM is clamped by the electrode fitting TMF.

The above-mentioned electrode support base TMS2 which constitutes a pair with the electrode support base TM1 also has the substantially equal constitution although the right-and-left relationship in the drawing becomes opposite.

Figures 1A, 1B, 1C:
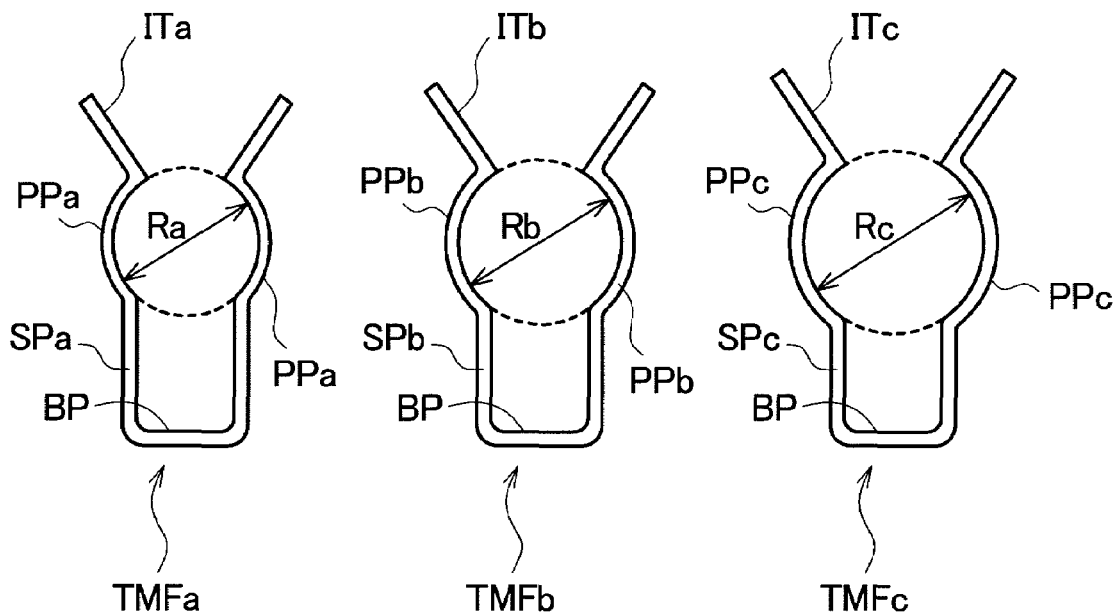
FIG. 1 is a cross-sectional view showing one embodiment of an electrode fitting used in a liquid crystal display device according to the present invention.

FIG. 1A to FIG. 1C are constitutional views showing one embodiment of the constitutions of the above-mentioned electrode fittings TMFa, TMFb and TMFc. That is, FIG. 1A to FIG. 1C in FIG. 5 are respectively cross-sectional views taken along a line I(a)-I(a), I(b)-I(b), I(c)-I(c).

As can be clearly understood from FIG. 1A to FIG. 1C, either one of these electrode fittings TMF adopts the bifurcated structure which includes a pair of opposedly facing tongues for clamping the external-electrode fluorescent lamp EFL from both sides.

To be more specific, firstly, in FIG. 1A, the electrode fitting TMF includes a pair of support portions Spa which is bent in the vertical direction, for example, from both sides of the base portion BP of the electrode support base TMS1, and a pair of pushing portions PPa which respectively push a peripheral surface of the external-electrode fluorescent lamp EFL from opposing sides at an end portions of the respective support portions SPa on a side opposite to the base portion BP.

A dotted circle shown in FIG. 1A indicates a circle which has the concentric relationship with a circle indicative of the peripheral surface of the external-electrode fluorescent lamp EFL. For example, a radius Ra of the circle is depicted smaller than a radius of the external-electrode fluorescent lamp EFL (radius Rb described later, for example).

The pushing portions PPa are respectively formed in a curved shape along arcs of left and right portions of the above-mentioned dotted circle except for upper and lower portions in the drawing. As a result, an arcuate recessed surface is formed on the respective opposedly facing sides of the respective pushing portions PPa, and the pushing portions PPa are brought into pressure contact with the external-electrode fluorescent lamp EFL at the recessed surfaces.

Here, the pushing portions PPa are pushed to the external-electrode fluorescent lamp EFL by making use of a resilient force stored by the support portions SPa.

Further, the electrode fitting TMFa includes introducing portions ITa for the external-electrode fluorescent lamp EFL which are formed in a state that the introducing portions ITa extend toward a side opposite to the support portions SPa from the pushing portions PPa and broaden a distance therebetween in the extending direction. The introducing portions ITa are provided for, at the time of introducing the external-electrode fluorescent lamp EFL into the pushing portions PPa of the electrode fitting TMFa, enabling such introduction of the external-electrode fluorescent lamp EFL by merely inserting the external-electrode fluorescent lamp EFL from above in the drawing.

The electrode fitting TMFb shown in FIG. 1B differs from the above-mentioned electrode fitting TMFa with respect to a point that the radius Rb defined by the recessed surfaces of the opposedly facing surface sides of the pushing portions PPb is set larger than the radius Ra.

A dotted circle shown in FIG. 1B is depicted as a circle having the radius Rb substantially equal to a radius of a circle indicative of a peripheral surface of the external-electrode fluorescent lamp EFL, for example, and the pushing portions PPa are respectively formed in a curved shape along arcs of right and left portions of the dotted circle except for upper and lower portions in the drawing.

The electrode fitting TMFc shown in FIG. 1C differs from the above-mentioned electrode fitting TMFb with respect to a point that the radius Rc defined by the recessed surfaces of the opposedly facing sides of the pushing portions PPc is set larger than the radius Rb.

A dotted circle shown in FIG. 1C indicates a circle which has the concentric relationship with a circle indicative of the peripheral surface of the external-electrode fluorescent lamp EFL, and a radius Rc of the circle is depicted larger than a radius Rb of the external-electrode fluorescent lamp EFL.

The pushing portions PPa are respectively formed in a curved shape along arcs of left and right portions of the dotted circle except for upper and lower portions in the drawing.

The electrode fitting TMF having such a constitution is configured to include three electrode fittings TMF which possess respectively different pushing forces against the electrode TM for every electrode TM of the external-electrode fluorescent lamp EFL. Accordingly, even when the irregularities are generated with respect to the radii of the external-electrode fluorescent lamps EFL formed with a standard of the radius Rb for example, out of three electrode fittings TMF, at least one electrode fitting TMF can ensure the sufficient electrical connection. Accordingly, it is possible to ensure the reliable power source supply to the respective external-electrode fluorescent lamps EFL.

With respect to the respective electrode fittings TMF shown in FIG. 1, each electrode fitting TMF includes the arcuate recessed surfaces on the opposedly facing surface sides of the pushing portions PP, and in clumping the external-electrode fluorescent lamp EFL, the electrode fitting TMF is brought into contact with the peripheral surface of the external-electrode fluorescent lamp EFL over a substantially whole area of the recessed surfaces. However, the electrode fitting TMF is not limited to such a constitution, and the electrode fitting TMF may be configured such that portions on the opposedly facing surfaces of the pushing portions PP which are brought into contact with the peripheral surface of the external-electrode fluorescent lamp EFL is preliminary limited to several points.

Figure 6A:
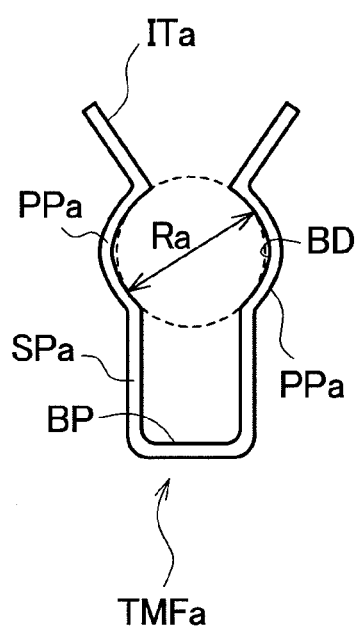
FIG. 6 is a cross-sectional view showing another embodiment of the electrode fitting used in the liquid crystal display device according to the present invention.
Figure 6B:
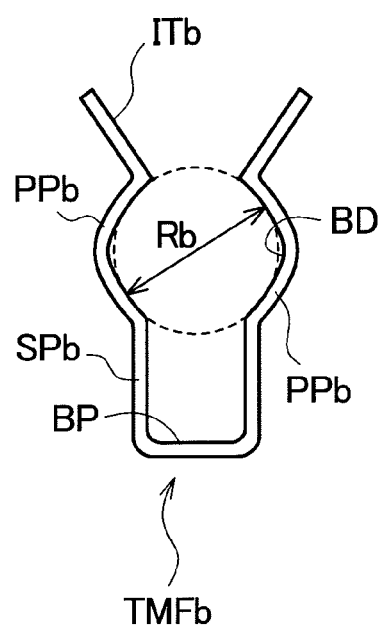
Figure 6C:
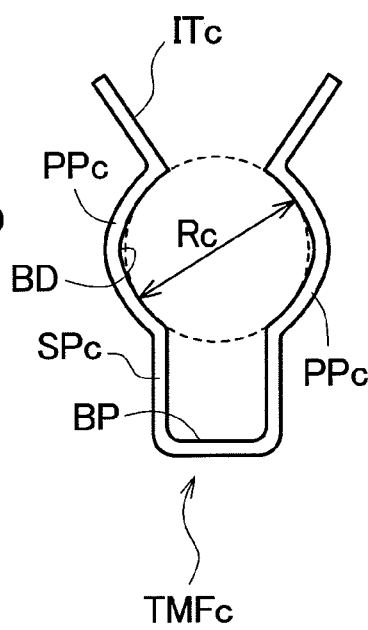

FIG. 6A to FIG. 6C show another embodiment of the electrode fitting TMF having such a constitution, and corresponds to FIG. 1. To compare the electrode fitting TMF of this embodiment with the electrode fitting TMF shown in FIG. 1, the constitution which makes this electrode fitting TMF different from the electrode fitting TMF shown in FIG. 1 lies in the constitution of the pushing portions PP. That is, the pushing portions PP form recessed surfaces having bent portions BD at substantially center portions thereof on respective opposedly facing sides thereof. Due to such a constitution, with respect to an imaginary circle depicted in the inside of the pushing portions PP, out of the opposedly facing sides of the pushing portions PP, sides arrange close to the support portion SP and sides close to the introducing portion IT are brought into contact with the imaginary circle. Accordingly, out of the opposedly facing sides of the pushing portions PP, portions which are brought into contact with the imaginary circle are grasped as projecting portions formed on the opposedly facing sides.

Also in this case, by making radii of the imaginary circles of the respective electrode fittings TMF different from each other respectively as Ra, Rb and Rc, it is possible to make the pushing forces of the respective electrode fittings TMF applied to the external-electrode fluorescent lamp EFL different from each other.

The above-mentioned embodiments adopt the constitution in which three electrode fittings TMF are connected to one electrode TM of the external-electrode fluorescent lamp EFL. However, the present invention is not limited to such a constitution, and two, four or more electrode fittings TMF may be connected to one electrode TM of the external-electrode fluorescent lamp EFL. Further, with respect to the plurality of the electrode fittings TMF connected to one electrode TM of the external-electrode fluorescent lamp EFL, it is sufficient that the number of the electrode fittings TMF which differ in the pushing force applied to the external-electrode fluorescent lamp EFL is at least two. This is because advantageous effects of the present invention can be obtained also in this case.

Further, in the above-mentioned embodiments, the case which uses the external-electrode fluorescent lamps as a light source is exemplified. However, the light source is not always limited to the external-electrode fluorescent lamps and may be constituted of rod-shaped light sources which are similar to the external-electrode fluorescent lamps in shape. This is because the present invention is directly applicable to these rod-shaped light sources.

The above-mentioned respective embodiments may be adopted in a single form or in combination. This is because the advantageous effect of the respective embodiments can be acquired independently or synergistically.

What is claimed is:

1. A liquid crystal display device comprising:
a liquid crystal display panel; and
a backlight arranged on a back surface of the liquid crystal display panel, wherein
the backlight includes a plurality of rod-shaped light sources each having electrode portions at both ends thereof and a base which supports the respective rod-shaped light sources at the respective electrode portions by way of an electrode fitting,
the electrode fitting is configured to fix the rod-shaped light source by clamping the electrode portion, the electrode fitting being formed of a plurality of electrode fittings arranged in parallel in the longitudinal direction of the rod-shaped light source for every electrode,
each of the electrode fitting has an arcuate wall surface, and
the respective electrode fittings arranged in parallel in the same electrode portion have radii of arcs of the wall surfaces thereof made different from each other.

2. A liquid crystal display device according to claim 1, wherein the respective electrode fittings arranged in parallel in the same electrode portion have pushing forces thereof applied to the electrode portion made different from each other.

3. A liquid crystal display device according to claim 1, wherein a bent portion is formed on the arcuate wall surface.

4. A liquid crystal display device according to claim 1, wherein the electrode fitting includes introducing portions for the rod-shaped light source which extend toward a side opposite to the base from the arcuate wall surfaces and broaden a distance therebetween in the extending direction thereof.

5. A liquid crystal display device according to claim 1, wherein the rod-shaped light source is an external-electrode fluorescent lamp.

6. A liquid crystal display device according to claim 1, wherein three electrode fittings are provided for one electrode portion.

7. A liquid crystal display device according to claim 1, wherein the liquid crystal display device includes an electrode support member, and a plurality of electrode fittings corresponding to the plurality of electrode portions is connected to the electrode support member.

8. A liquid crystal display device according to claim 7, wherein the electrode support member electrically connects the plurality of electrodes arranged in parallel on one side of the base with each other.

9. A liquid crystal display device according to claim 7, wherein two electrode support members are mounted on one base.

10. A liquid crystal display device according to claim 7, wherein the electrode support member and the plurality of electrode fittings are integrally formed using a conductive sheet material.

* * * * *